INVENTORS:
BERNARD PAULIS
JOHANNES RADDER
BY *Lewis C. Brown*
THEIR ATTORNEY

United States Patent Office 3,137,739
Patented June 16, 1964

3,137,739
PROPYLENE POLYMERIZATION
Bernard Paulis and Johannes Radder, Amsterdam, Netherlands, assignors to Shell Oil Company, New York, N.Y., a corporation of Delaware
Filed Aug. 7, 1962, Ser. No. 215,365
Claims priority, application Netherlands Jan. 24, 1962
1 Claim. (Cl. 260—683.15)

This invention relates to a process for the polymerization of olefins and for the subsequent preparation of finished detergent compositions from said olefins. More particularly, the present invention relates to a process for the manufacture of mixtures of mono-olefins, the utilization of these olefins to form detergent alkylate mixtures (alkylbenzene compounds), followed by the sulfonation and neutralization of the detergent alkylate to form alkylbenzene sulfonates with surface-active properties.

It is known that in the large scale production of detergents, the composition of the olefin mixtures used to prepare the detergent alkylate (usually arylalkanes) largely determines the quality of the final detergent products. Olefin mixtures employed for the production of detergent alkylate (from which the alkylaryl sulfonates are ultimately synthesized) are generally characterized by their method of production. For example, olefin mixtures obtained from catalytically cracked petroleum oil yield detergents with properties quite different from those detergents which are manufactured from olefin mixtures obtained from the polymerization of low molecular weight alkenes.

The olefin mixtures which are used as the starting materials in preparing the surface active agents according to the process of the present invention are obtained in high yield by using a tandem arrangement of polymerization reactors. Each reactor contains a different polymerization catalyst. The effect of using the reactors in combination has been found to surpass the performance of either reactor when used alone. The alkylaryl sulfonates (such as alkylbenzene sulfonates) derived from the alkene polymers so produced excel in both foaming power and foam stability.

In preparing these olefin mixtures two polymerization reactors are connected in parallel with a recycle connection between the two reactors. One reactor contains a solid olefin-polymerization catalyst of the phosphoric-acid type and the other contains an $Al_2O_3/SiO_2$ catalyst. By controlling this basic system in accordance with the ensuing explanation, streams of olefin polymers with from 12 to 15 carbon atoms and containing a very high content of $C_{13-15}$ alkenes may be manufactured. From this $C_{13-15}$ fraction of olefins, tridecylbenzene sulfonates with an average side chain length of from 13.0 to 14.5 carbon atoms may be produced. These alkene-polymer based alkylbenzene sulfonates possess excellent foaming properties (even in hard water) as well as good cotton detergency.

In the process of the present invention alkylaryl sulfonate detergents (preferably alkylbenzene sulfonate detergents which are sodium or potassium sulfonates in which the alkyl moiety contains from 12 to 15 carbon atoms) are prepared by simultaneously polymerizing a mono-olefin-containing stream (preferably a propene-propane stream from a refinery) in a first reactor which contains a solid phosphoric acid polymerization catalyst and in a second reactor which contains an alumina catalyst (with $SiO_2$) to produce a polymerization mixture rich in $C_{12-15}$ alkenes. The second (alumina-containing) reactor is also fed with recycled $C_9$–$C_{11}$ alkenes formed from both the first (phosphoric acid-containing) reactor and the second reactor. No recycle is employed in the phosphoric acid containing reactor. The $C_{12}$–$C_{15}$ alkene mixture thus produced is separated into a $C_{12}$ fraction and a $C_{13}$–$C_{15}$ fraction. Each fraction is then converted to an alkyl aryl sulfonate (preferably an alkylbenzene sulfonate) with either 12 or from 13 to 15 carbon atoms in the side chain. This alkylation of an aromatic nucleus is carried out by reacting the olefin with a suitable aromatic compound (benzene, toluene, xylene, etc.) in the presence of an alkylation catalyst such as sulfuric acid, aluminum chloride-hydrocarbon catalysts, and anhydrous hydrogen fluoride. The molecular ratio of aromatic hydrocarbon to olefin is at least 5 to 1 and preferably about 10:1 or 15:1. When sulfuric acid or hydrofluoric is employed as a catalyst, an amount equal in volume to the total hydrocarbon reactants is used. The alkylated aromatic compounds are separated from the reaction mixture and then sulfonated by contact with concentrated sulfuric acid (at least 97% by weight) at temperatures up to about 50° C. Sulfuric acid of up to 100% concentration and oleum containing up to 20% $SO_3$ may be used. Volume ratios of sulfuric acid to total hydrocarbon (alkylaryl compounds) may vary from 0.8:1 to about 1.25:1, with an approximate 1:1 ratio being preferable. The sulfonated alkylaryl compounds are then separated by conventional means (for example, decantation) from the unsulfonated hydrocarbons and converted to sulfonic acid salts by neutralization with a suitable base. Aqueous sodium hydroxide, sodium bicarbonate, sodium carbonate, and the corresponding potassium salts, or mixtures of such salts, may be employed in the neutralization step. Any suitable alkaline earth, alkali metal, ammonium or amine salt may be employed to produce the corresponding sulfonate salt. The neutralization is ordinarily carried out at from 20° C. to 100° C.

FIGURE 1 represents a particular embodiment for manufacturing detergents according to the process of the present invention with special emphasis on the use of a parallel two-stage polymerization reactor system.

One aspect of the present invention may be described as a three-step process comprising polymerization, alkylation, and sulfonation.

The polymerization step of the present invention is carried out by sending a portion of a propylene feed stream to each of two reactors containing different catalysts. The distribution of the propylene feed stream between the two reactors is maintained at a given value while alkene polymers with from 9 to 11 carbon atoms are separated from the phosphoric acid-containing reactor and recycled to the $Al_2O_3/SiO_2$-containing reactor. The propylene polymers with from 9 to 11 carbon atoms, inclusive, may be separated from the combined reaction products of the phosphoric acid catalyst-containing reactor by distillation. The desired final products (from the $Al_2O_3/SiO_2$-containing reactor), which are alkene polymers with from 12 to 15 carbon atoms, inclusive, are likewise separated by distillation. This $C_{12-15}$ portion may subsequently be split into two fractions, one containing 12 carbon atoms in the olefin molecule and the other composed of a mixture of alkene polymers with from 13 to 15 carbon atoms in the molecule. When this method of polymerization is used, the yield of $C_{12}$–$C_{15}$ olefin product (expressed as percent by weight of the propene feed) shows a substantial increase over the yields obtained when either reactor system is used alone or the two are simply in parallel. In addition, the production of olefins per kilogram of catalyst per hour is increased as well as the quality of the products obtained. A superior class of alkylbenzene sulfonate detergents may be prepared from the $C_{13}$–$C_{15}$ olefin fraction manufactured in the first step of the process of the present invention.

The alkene feed to the polymerization step may be pure or substantially pure, propene. The preferred feeds to the polymerization step are commercially available mixtures such as the propene-propane gas mixtures available at petroleum refineries. These refinery mixtures generally contain from about thirty to sixty-five percent propene with the remainder of the stream composed almost entirely of propane. Other petroleum-derived mixtures containing substantial amounts of propene may also be fed to the polymerization reactors.

The first polymerization reactor contains a solid phosphoric acid catalyst, such as ortho-phosphoric acid on a solid carrier. A suitable solid carrier for this purpose is $SiO_2$, such as quartz chips. Catalysts of this type can be obtained commercially. In this first polymerization reactor the reaction conditions are adjusted so that a considerable part of the propene feed is converted into $C_9$–$C_{11}$ alkene polymers. These $C_9$–$C_{11}$ alkene polymers, after separation from the combined reaction products by distillation, serve as a part of the feed to the second reactor. In order to obtain a high conversion of propene to $C_9$–$C_{11}$ alkene polymers in the first polymerization reactor, the average catalyst temperature in this reactor should be kept at a value from 200° C. to 250° C. and preferably at from 215° C. to 235° C. Under these temperature conditions the pressure should be at least 20 atmospheres and preferably from at least 35 atmospheres up to 100 atmospheres. Space velocities of from 1.5 to 3.5 liters, inclusive, (preferably from two to three liters) of total liquid feed per kilogram of catalyst per hour are suitable for application in the phosphoric acid-containing reactor.

In the second reactor an alumina catalyst ($Al_2O_3/SiO_2$) is employed. The main purpose of the second reactor is to convert the incoming mixture of $C_9$–$C_{11}$ alkene polymers and propene into the desired $C_{12}$–$C_{15}$ alkene polymers in such a way that the content of $C_{13}$–$C_{15}$ alkene polymers is as high as possible. In order to accomplish this, the feed in this reactor should be passed over a catalyst in which the weight ratios of $Al_2O_3$ to $SiO_2$ are from 3:97 to 30:70. Particularly suitable ratios of $Al_2O_3$ to $SiO_2$ are those from 9:91 to 14:86. Catalysts of this type are commercially available. The average catalyst temperature in this second reactor should lie between 130° C. and 150° C. and preferably between 135° C. and 145° C. while the pressure in this reactor should be sufficient to maintain the olefin feed in the liquid state while the feed is contacted with the catalyst bed. It has been found that both the propene conversion and yields of desired polymers are reduced when the pressure is insufficient to maintain the feed in the liquid state. Vapor phase conversion is therefore avoided in the present process when maximum yields are desired. Under the temperature conditions stated, pressures of at least 44 atmospheres are usually sufficient with pressures up to 100 atmospheres being suitable. The space velocities in the second reactor may be from 1.5 to 3.5 liters of total liquid feed per kilogram of catalyst per hour, and preferably from 2 to 3 liters, inclusive, of liquid feed per kilogram of catalyst per hour.

The feed to the second reactor contains a mixture of $C_9$–$C_{11}$ alkene polymers in addition to the propene. The $C_9$–$C_{11}$ alkene polymers are obtained from the combined reaction products of the first (phosphoric acid-containing) reactor by distillation. The ratio between the parts into which the main propene-containing feed stream is divided (expressed as the percentage of propene which is sent to the first reactor) determines the quantity of $C_9$–$C_{11}$ alkene polymers formed. Thus, there is a relationship between the recycle ratio (expressed as the ratio by weight of the $C_9$–$C_{11}$ alkene polymers to the weight of propene introduced into the second reactor) and the distribution ratio. The process proceeds particularly well when the recycle ratio has a value of from 0.7 to 3, inclusive, and preferably from 1 to 2, inclusive. For any given recycle ratio (especially recycle ratios in the previously mentioned ranges) the distribution ratio (the percent by weight of propene which is to be sent to the first reactor) may be found by the following formula:

$$P = -a(6.2\ R^2 - 36.2\ R - 21)$$

wherein:

$P$ is the distribution ratio (defined as the percent of the total propene feed which is to be sent to the first, phosphoric-acid containing, reactor in any given unit of time)

$R$ is the recycle ratio (which is defined as the weight ratio of the $C_9$–$C_{11}$ alkene polymers to the weight of the propene fed to the second reactor), and $a$ represents a factor which may take any value from 0.97 to 1.03, inclusive.

In order to obtain good operation of the $Al_2O_3/SiO_2$ catalyst in the second reactor, any water which still remains in the feed should be removed. This may be accomplished by drying the propene-propane feed to the second reactor. Any suitable method of drying may be used. For example, the propene-propane feed mixture may be passed over a solid drying agent prior to its entry into the second reactor. It is generally not necessary to dry the $C_9$–$C_{11}$ polymer fraction because the fraction has already passed several distillation columns and the water content is therefore low. Additional drying, if desirable, can be accomplished by using a drying agent.

The $C_{12}$–$C_{15}$ polymer fraction obtained from the second reactor can be completely processed into a finished detergent by alkylation, sulfonation, and neutralization steps. However, the $C_{13}$–$C_{15}$ polymers give a superior finished detergent and for this reason it is advantageous to split the $C_{12}$–$C_{15}$ fraction into a $C_{12}$ part and a $C_{13}$–$C_{15}$ part. Both the $C_{12}$ and $C_{13}$–$C_{15}$ parts may be converted into detergent alkylates, but it is desirable that the $C_{12}$–$C_{15}$ polymer contain as high a proportion of $C_{13}$–$C_{15}$ olefins as possible. The process of the present invention results in the formation of a $C_{12}$–$C_{15}$ olefin mixture with a very high proportion of $C_{13}$–$C_{15}$ olefins. This olefin portion produces a very high grade of detergent when converted to an alkaline earth metal alkylaryl sulfonate or an alkali metal alkylaryl sulfonate (preferably a sodium or potassium alkylaryl sulfonate).

Figure 1:
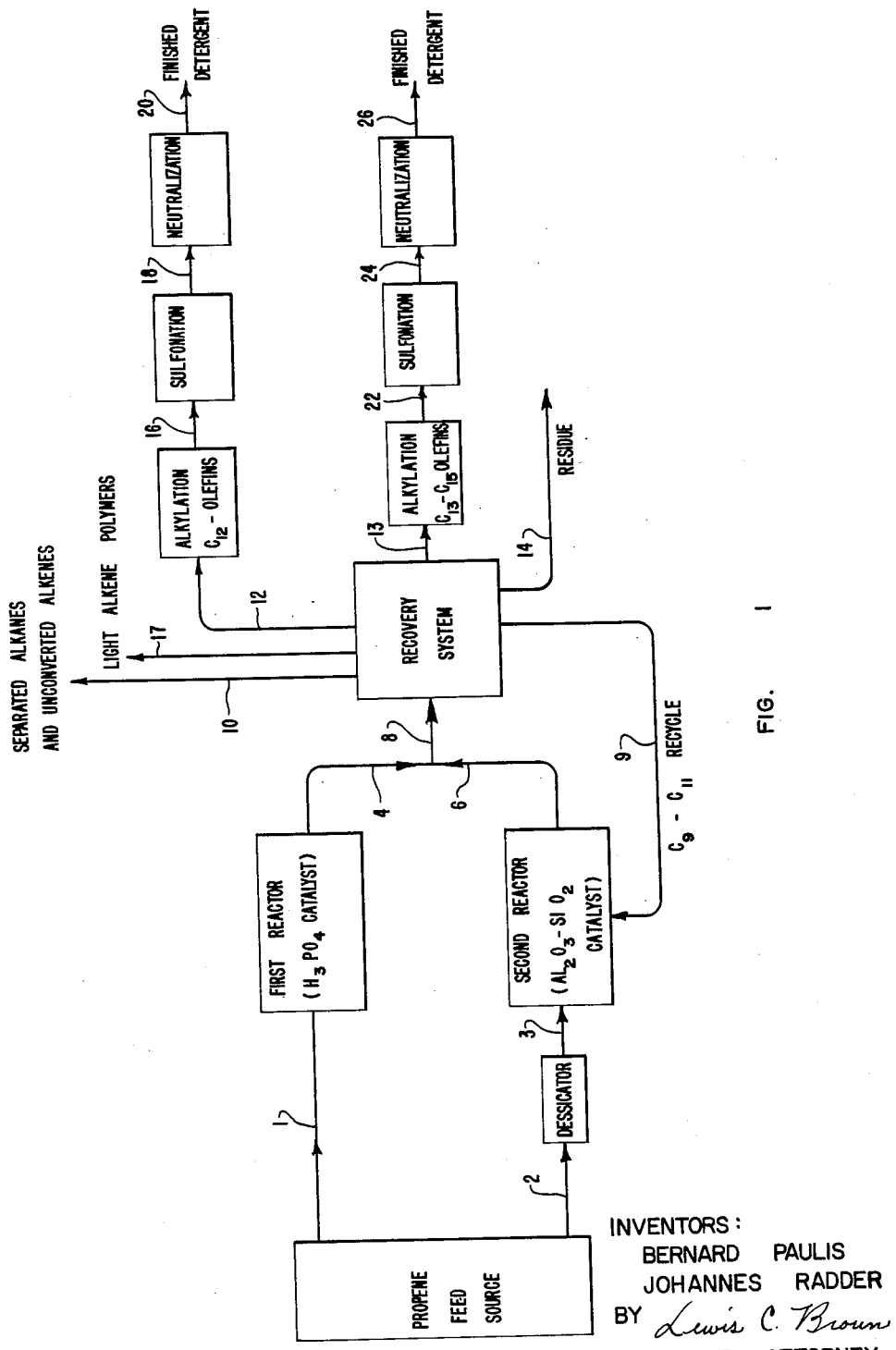
FIGURE 1 illustrates the process of the present invention in schematic form.

In FIGURE 1, propene from a suitable feed source is transferred to the first reactor containing a solid phosphoric acid catalyst through line 1. Similarly, propene is fed to the second reactor containing an $Al_2O_3/SiO_2$ catalyst through line 2 to a dessicator (to remove any water) and from the dessicator to the second reactor through line 3. Reaction products from the first reactor are removed, sent through line 4 to line 8, and from line 8 to a recovery system. Reaction products from the second reactor are removed through line 6 and sent from line 6 to line 8 which is connected to the recovery system. The recovery system produces three final olefin streams: a $C_9$–$C_{11}$ olefin stream, a $C_{12}$ olefin stream and a $C_{13}$–$C_{15}$ olefin stream. In addition, alkanes and unconverted alkenes such as propene are removed through line 10. The $C_9$–$C_{11}$ olefin stream is recycled through line 9 to the second reactor which contains the $Al_2O_3/SiO_2$ catalyst. The $C_{12}$ and $C_{13}$–$C_{15}$ olefin streams (obtained from a first separation of a $C_{12}$–$C_{15}$ olefin stream) are each converted into detergent compositions. Any residue from the recovery system is removed through line 14. The $C_{12}$ olefins are transferred by means of line 12 to an alkylation zone, where detergent alkylates are produced. The detergent alkylate is sent to a sulfonation zone through line 16.

The sulfonated detergent alkylate is sent to a neutralization zone through line 18 and the finished $C_{12}$-alkylarylsulfonate detergent product is removed through line 20. Similarly, the separated $C_{13}$-$C_{15}$ olefins are removed to an alkylation zone through line 13, the detergent alkylate formed is transferred to a sulfonation zone through line 22, the sulfonated product is sent to a neutralization zone through line 24, and the finished $C_{13-15}$-alkylarylsulfonate detergent product is removed via line 26.

Figure 2:
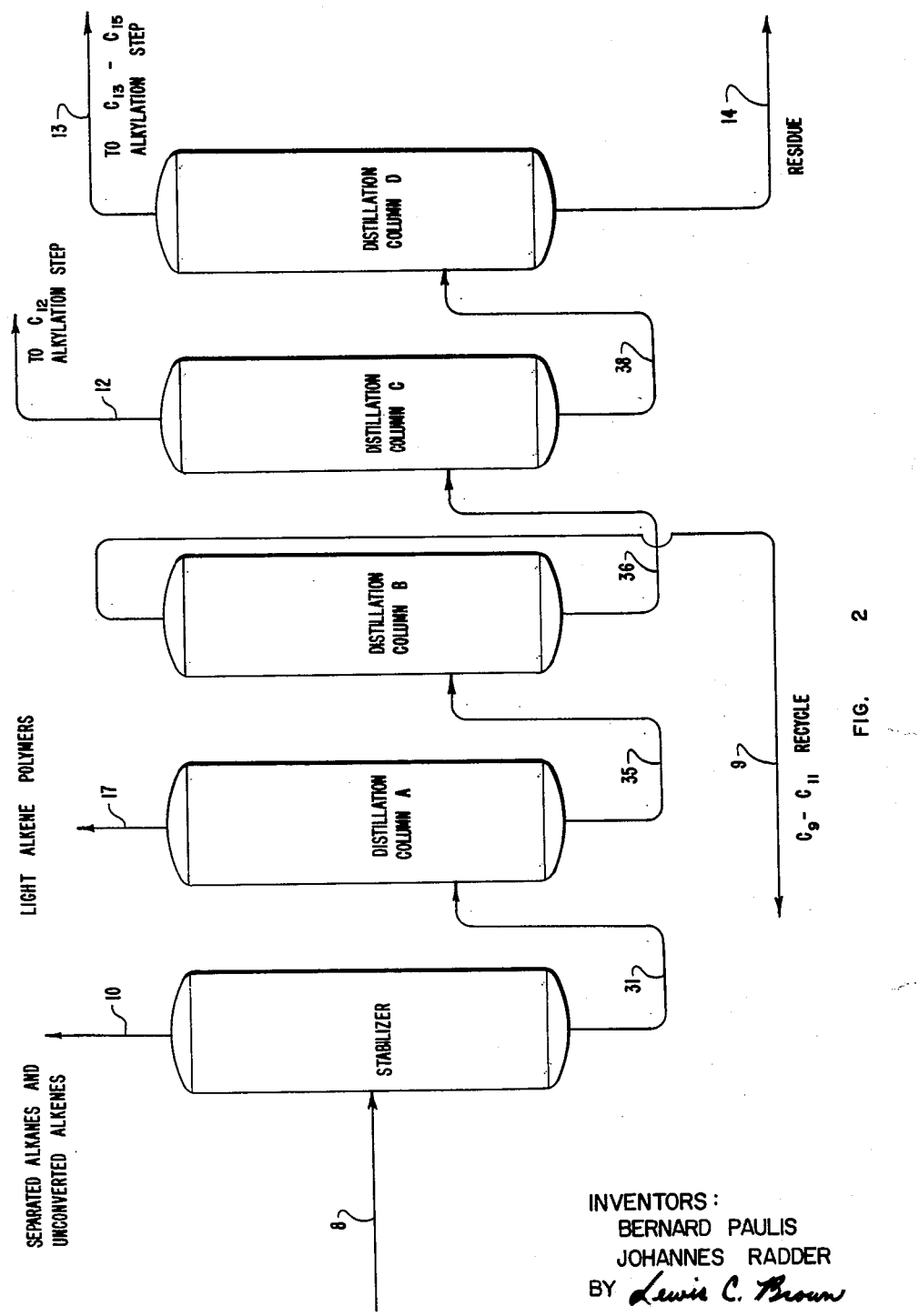
FIGURE 2 represents a detailed view of a suitable recovery system.

In FIGURE 2, combined reaction products from the first and second reactors containing polymerized olefins, alkanes, and unreacted olefin monomers are fed through line 8 to a stabilizer in the recovery system. The combined reaction products are stripped of unconverted alkenes and alkanes originating from the original feed. The unconverted alkenes and alkanes are removed from the stabilizer through line 10. The bottom product from the stabilizer is carried by line 31 to a distillation column A where light alkene polymers are separated and carried outside of the system through line 17. The lower boiling portion is sent to distillation column B through line 35. In distillation column B a $C_9$-$C_{11}$ fraction of alkene polymers is separated and sent back to the second ($Al_2O_3$/$SiO_2$-containing) reactor through line 9. The remainder of the reaction products in distillation column B are fed to a distillation column C (through line 36) which separates a $C_{12}$ fraction of alkene polymers. The $C_{12}$ fraction of alkene polymers is removed via line 12 and sent to the alkylation step. The remainder of the reaction products in distillation column C are fed to distillation column D through line 38. In column D, a $C_{13}$-$C_{15}$ alkene polymer fraction is separated and sent to an alkylation step through line 13. Any residue from the recovery process is removed via line 14.

In a typical run, the first reactor contains 1090 kilograms of a solid, phosphoric-acid-containing catalyst. The average catalyst temperature is 225° C., the pressure in the first reactor is 40 atmospheres, and the liquid hourly space velocity (LHSV), in liters of total liquid feed per kilogram of catalyst per hour, is 2.5. The second reactor contains 1000 kilograms of a catalyst composed of approximately 12 percent by weight of $Al_2O_3$ and approximately 88 percent by weight of $SiO_2$. The average catalyst temperature in the second reactor is 135 to 145° C., the pressure is about 55 atmospheres, and the liquid hourly space velocity (LHSV), in liters of total liquid feed per kilogram of catalyst per hour, is 2.5. A specific recovery system which is used is composed of five distillation columns. The propene feed source is a mixture of propene and propane which contains about 56 percent by weight of propene. This mixture is introduced into the two reactors at total combined rate of 2,427 kilograms per hour so that 1,359 kilograms of propene and 1,068 kilograms of propane enter the system in a one hour time period. For a recycle ratio of 1.9 (recycle of $C_9$-$C_{11}$ polymers from the recovery system through line 9 to the second reactor), the appropriate distribution ratio of the total feed is found by applying the formula:

$$P = a(36.2R - 6.2R^2 + 21)$$

wherein P, $a$, and R are as previously defined. When R is 1.9 and $a$ is 1.0, P from the above formula is 67.4 percent by weight. This means that (67.4 x 1359)/100 or 915 kilograms of propene per hour (plus 719 kilograms of propane per hour) is sent to the first reactor through line 1. The remainder of the stream, which delivers 444 kilograms (1359–915) of propene per hour and 349 kilograms (1068–719) of propane per hour is sent to the second reactor through lines 2 and 3. At the same time, the feed rate of $C_9$-$C_{11}$ alkene polymers (obtained from the recovery system) to the second reactor is 849 kilograms per hour. The combined products from each reactor (a total of 3,276 kilograms per hour) are sent to the recovery system through lines 4, 6, and 8. This combined feed to the recovery system (3,276 kilograms per hour) is sent to a stabilizer where it is stripped of the unconverted propene (332 kilograms per hour) and of the propane originating from the feed (1068 kilograms per hour). The propane-propene mixture is removed from the stabilizer via line 10. The bottom product from the stabilizer is carried to a distillation column (column A in FIGURE 2) at a rate of 1,876 kilograms per hour; 171 kilograms per hour of light alkene polymers with a boiling point below 132° C. is carried outside of the recovery system through line 17. The remaining product from distillation column A is sent to distillation column B through line 35 at the rate of 1,705 kilograms per hour. In distillation column B a $C_9$-$C_{11}$ alkene polymer fraction is split out and sent via line 9 to the $Al_2O_3$/$SiO_2$-containing reactor at the rate of 849 kilograms per hour. The products remaining in distillation column B after removal of the $C_9$-$C_{11}$ alkene polymer portion is then sent to distillation column C at the rate of 865 kilograms per hour via line 36. From distillation column C $C_{12}$ alkene polymers with a boiling range of 191–206° C. are removed through line 12 at the rate of 296 kilograms per hour. The products remaining in distillation column C after removal of the $C_{12}$ alkene polymer fraction are transferred to distillation column D through line 38. From distillation column D a $C_{13}$-$C_{15}$ alkene polymer fraction with a boiling range from 206 to 260° C. is obtained at a rate 319 kilograms per hour. This $C_{13}$-$C_{15}$ alkene polymer fraction is removed through line 13. The residue of the alkene polymer fraction from distillation column D has a boiling point above 260° C. and is removed at a rate of 241 kilograms per hour.

Table I summarizes the data of the example described above and compares these results with the results obtained with conventional processes. Specifically, the polymerization step of applicants' process is compared with the results obtained when the polymerization step is carried out:

(1) with the aid of an $Al_2O_3$/$SiO_2$ catalyst, an average catalyst temperature of 140° C., a pressure of 50 atmospheres, and an LHSV of 2.5, but without the application of a recycle, and (2) with the aid of a solid phosphoric acid-containing catalyst at an average catalyst temperature of 225° C., a pressure of 40 atmospheres, a liquid hourly space velocity of 2.5 liters of liquid feed per kilogram of catalyst per hour, and a recycle ratio of 2.1 ($C_9$-$C_{11}$ alkene polymers/propene).

From Table I it is apparent that the propene conversion, expressed in percent by weight, does not vary widely for the various processes, the conversion values being 77, 78, and 74 percent for the process of the present invention, the use of an $Al_2O_3$/$SiO_2$ catalyst alone, and the use of phosphoric acid catalyst alone, respectively. The yields of the desired polymer fraction with a boiling range of from 191° C. to 260° C. ($C_{12}$-$C_{15}$ alkene polymers) amount to 294, 220, and 91 kilograms per 1000 kilograms of catalyst per hour, respectively. For the fraction with a boiling point below 191° C. the amounts recovered were 82, 225, and 315 kilograms per 1000 kilograms of catalyst per hour, respectively. The yields of polymers boiling above 260° C. were 115, 19, and 131 kilograms per 1000 kilograms of catalyst per hour, respectively.

Table II relates to the same experimental results, but in this table the yields of the various alkene polymer fractions are expressed as a percentage of the total quantity of polymers obtained.

From Tables I and II it is easily seen that the quantities of $C_{12}$ and $C_{13}$-$C_{15}$ alkene polymers obtained in the polymerization step of the present process are greater than the yields obtained with either of the other processes. In addition, the quantity of undesired polymers, i.e. those with less than 12 carbon atoms in the molecule (boiling point below 191° C.) is also smaller.

The quality of the $C_{13}$-$C_{15}$ alkene polymers can be indicated by means of the amount of ring compounds in this $C_{13}$-$C_{15}$ fraction. The lower the content of ring compounds, the better the quality of the alkene polymer. From Table I it is apparent that the two conventional processes yield $C_{13}$-$C_{15}$ alkene polymers with a ring content of 17 percent by volume (for the phosphoric acid process) and 19 percent by volume (for the $Al_2O_3/SiO_2$ process). The polymerization step of applicants' process reduces the content of ring compounds to 15 percent by volume.

Table III illustrates the improvements obtained in the properties of the final detergent compositions obtained according to the process of the present invention. The foam performance was measured in both hard water and soft water by both the Soil Titration Test (STT) and the Canteen Dishwashing Test (CDWT). When the soil titration test was used to compare detergent properties, the concentration of detergent Active Matter (AM) was 0.5 g./liter. When the canteen dishwashing test was used to compare detergent properties, the active matter (detergent) concentration was 0.2 g./liter. The canteen

Table I

| Process | Conditions | Propene conversion in percent by weight | Boiling range of propene polymer fraction, °C. | | | | | | | | Ring content in percent by volume of the propene polymer fraction boiling from 206-260° C. |
|---|---|---|---|---|---|---|---|---|---|---|---|
| | | | <191 ≤132 | 191-206 | 206-260 | >260 | <191 ≤132 | 191-206 | 206-260 | >260 | |
| | | | Yield in percent by weight, calculated on propene feed | | | | Yield in kg. per 1000 kg. catalyst per hour | | | | |
| I | REACTOR 1<br>Catalyst—$H_3PO_4/SiO_2$:<br>Temperature—225° C.<br>Pressure—40 atm.<br>LHSV¹—2.5 l./kg. cat./h.<br>Recycle ratio—no recycle.<br><br>REACTOR 2<br>Catalyst—$Al_2O_3/SiO_2$ (12/88):<br>Temperature—140° C.<br>Pressure—55 atm.<br>LHSV¹—2.5 l./kg. cat./h.<br>Recycle ratio—1.9($C_9$-$C_{11}$ pol./$C_3^=$). | 77 | 13 | 22 | 24 | 18 | 82 | 142 | 152 | 115 | 15 |
| | | | | 46 | | | | 294 | | | |
| II | Catalyst—$Al_2O_3/SiO_2$ (12/88):<br>Temperature—140° C.<br>Pressure—50 atm.<br>Space velocity (LHSV)—2.5 l./kg. cat./h.<br>Recycle ratio—no recycle. | 74 | 35 | 10 | 14 | 15 | 315 | 94 | 126 | 131 | 19 |
| | | | | 24 | | | | 220 | | | |
| III | Catalyst—$H_3PO_4/SiO_2$.<br>Temperature—225° C.<br>Pressure—40 atm.<br>Space velocity (LHSV)—2.5 l./kg. cat./h.<br>Recycle ratio—2.1($C_9$-$C_{11}$ pol./$C_3^=$). | 78 | 52 | 11 | 10 | 5 | 225 | 47 | 44 | 19 | 17 |
| | | | | 21 | | | | 91 | | | |

¹ Space velocity.

Table II

| Conditions | Boiling range of polymer fraction, °C. | | |
|---|---|---|---|
| | 191-206 | 206-260 | <191+>260 |
| | Yield of polymer fractions obtained in percent of the total quantity of polymers obtained | | |
| Catalyst—$H_3PO_4/SiO_2$:<br>t.=225° C., p.=40 atm.<br>Space velocity (LHSV)=2.5 l./kg. cat./h.<br>Recycle ratio=2.1 ($C_9$-$C_{11}$ pol./$C_3^=$). | 14 | 13 | |
| | 27 | | 73 |
| Catalyst—$Al_2O_3/SiO_2$ (12/88):<br>t.=140° C., p.=50 atm.<br>Space velocity (LHSV)=2.5 l./kg. cat./h.<br>Recycle ratio: no recycle. | 14 | 19 | |
| | 33 | | 67 |
| Process according to the invention (example). | 29 | 31 | |
| | 60 | | 40 | dishwashing test is performed by preparing one gallon of the detergent at an active matter concentration of 0.5 g./liter at 45° C. A foam is beaten up in a standardized manner (beating for 30 seconds) and the number of soiled plates which can be washed before the foam is reduced to a thin surface layer of bubbles with approximately 10% of the free surface visible is determined. From this data the results of Table III are calculated. The soil titration test is another method of evaluating detergent foam performance and is based upon the amount of a standard "soil" solution which must be added to 100 milliliters of a solution containing 0.2 g./liter of detergent active matter to reduce the foam. The "soil" (a mixture of 15 parts of neutral tallow, 15 parts of plain flour, and 0.5 parts of sodium chloride dispersed in 70 milliliters of water) is added in increments of 0.2 ml. to a bottle containing 100 ml. of the detergent solution. The solution is agitated by turning the bottle five times (or mechanically). The end point is the stage at which the foam height in the bottle just falls below 0.5 cm., at which point the total milliliters of "soil" added is determined and from this data the comparative values of Table III are obtained. From the comparisons in Table III, it is easily seen that those alkylbenzene-sulfonates which contain an average of from 13 to 15 carbon atoms in the side chain give better results than those with an average side chain length of about 12 carbon atoms.

Similar results are obtained whether the alkylbenzene sulfonate is a sodium or potassium salt.

Table III
PERFORMANCE OF PROPYLENE-POLYMER-BASED ALKYLBENZENE SULFONATES

| | 12.0 | 12.5 | 13.0 | 13.5 | 14.5 |
|---|---|---|---|---|---|
| Average Side Chain Length | 12.0 | 12.5 | 13.0 | 13.5 | 14.5 |
| Average Molecular Weight | 246 | 253 | 260 | 267 | 280 |
| Foam Performance (Procter and Gamble [1] built, 45° C.): | | | | | |
| (1) Hard Water, 230 p.p.m.— | | | | | |
| (A) STT 0.5 g. AM/l | 100 | 115 | 128 | 135 | 125 |
| (B) CDWT 0.2 g. AM/l | 100 | 114 | 140 | 140 | 100 |
| (2) Soft Water, 50 p.p.m.— | | | | | |
| (A) STT 0.5 g. AM/l | 100 | 118 | 139 | 145 | 150 |
| (B) CDWT 0.2 g. AM/l | 100 | 220 | 500 | 500 | 525 |

[1] Composed of 25% by weight of active material (detergent), 32% tripolyphosphate, 6% alkaline water-glass, 26% $Na_2SO_4$, and the remainder water.

I claim as my invention:

In a propylene polymerization process wherein a $C_3$ hydrocarbon feed consisting essentially of propylene is contacted with polymerization catalyst in two reaction zones arranged in parallel flow, and combined effluence from said reaction zones is separated by distillation in a product separating zone into a number of different fractions, the improvement of increasing the production of $C_{13}$–$C_{15}$ fractions boiling from 206° to 260° C. and having a reduced content of ring compounds by (1) utilizing as catalyst in a first one of said reaction zones a solid phosphoric acid catalyst and maintaining a temperature therein of from 215° C. to 235° C. and a pressure of from 35 to 100 atmospheres and passing reactants therethrough at a space velocity from 1.5 to 3.5 liters of total liquid feed of catalyst per hour, (2) utilizing as catalyst in the second of said reaction zones an alumina-silica catalyst in which the weight ratio of $Al_2O_3$ to $SiO_2$ is from 3:97 to 30:70 and maintaining a temperature of from 130° to 150° C. and a pressure of from 44 to 100 atmospheres and passing reactants therethrough at a space velocity of from 1.5 to 3.5 liters of total liquid feed of catalyst per hour, (3) separating from said effluence in said separating zone the fraction of $C_9$–$C_{11}$ hydrocarbons boiling from 132° to 191° C. and recycling this fraction to the second reaction zone, and (4) distributing the $C_3$ hydrocarbon feed to the second reaction zone as such that the weight ratio of the $C_9$–$C_{11}$ recycle to the second reaction zone to the propylene fed to the second reaction is from 0.7 to 3.

References Cited in the file of this patent
UNITED STATES PATENTS

| | | |
|---|---|---|
| 2,572,724 | Hinds et al. | Oct. 23, 1951 |
| 2,617,839 | Moore et al. | Nov. 11, 1952 |
| 2,622,113 | Hervert | Dec. 16, 1952 |